March 5, 1968
C. D. MENEGOZ ETAL
3,372,223
ELECTRIC ARC REDUCTION FURNACE AND METHOD
Filed Jan. 13, 1965
2 Sheets-Sheet 1
—Fig. 1—
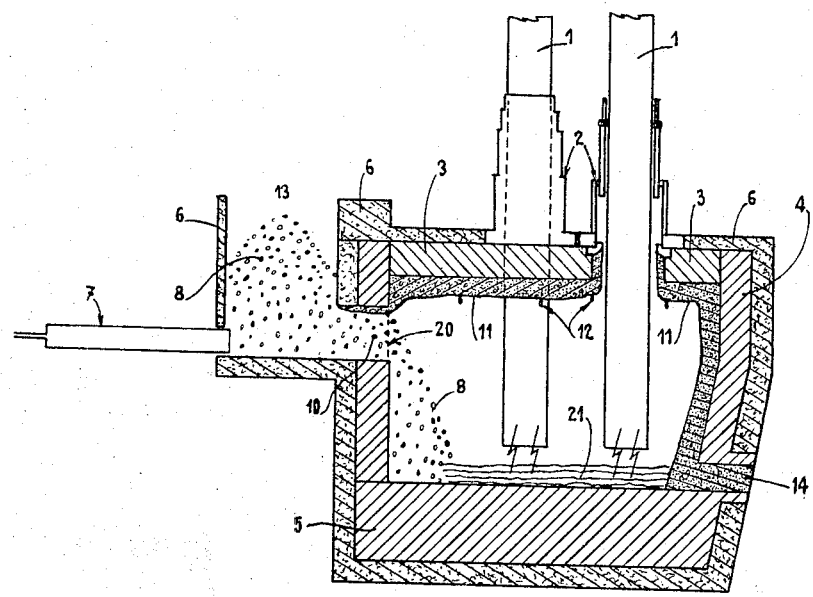
—Fig. 2—
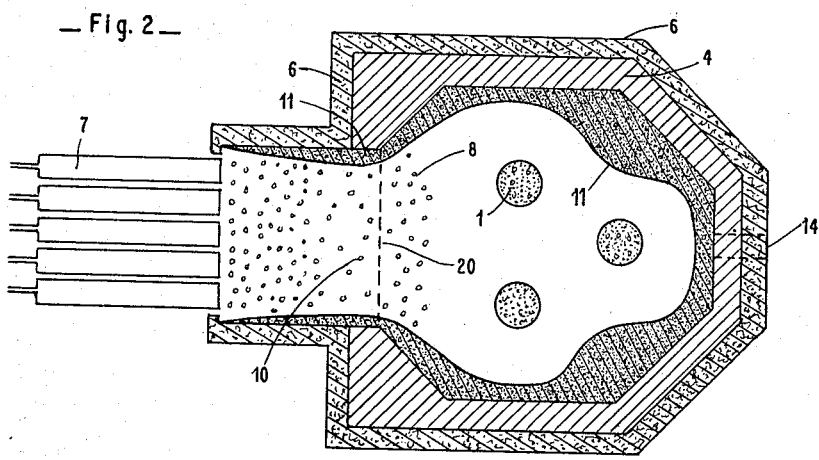
INVENTORS
CHARLES DANIEL MENEGOZ, FRANCOIS DAMESIN &
BY SERGE SOCQUET
McDougall, Hersh & Scott ATTYS.

United States Patent Office 3,372,223
Patented Mar. 5, 1968

3,372,223
ELECTRIC ARC REDUCTION FURNACE
AND METHOD
Charles Daniel Menegoz, Francois Damesin, and Serge Socquet, Mourenx-Ville-Nouvelle, Basses Pyrenees, France, assignors to Pechiney Compagnie de Produits Chimiques et Electrometallurgiques, Paris, France
Filed Jan. 13, 1965, Ser. No. 425,229
Claims priority, application France, Jan. 14, 1964, 960,249
25 Claims. (Cl. 13—9)

This invention relates to electric arc furnaces for the production of metal by reduction of its oxide ores and it relates also to a process for the operation of such ore reduction furnaces.

Reduction of ores, in the form of metal oxides, in a furnace of the open type which makes use of a submerged arc and feed of raw material into the portion of the furnace between the walls of the furnace and the electrodes is well known. The bath formed of the reduced metal on the hearth of the furnace usually reaches a temperature below 2000° C. such that, as in the case of carbothermic reduction of silicon dioxide in the production of silicon, it has been necessary, in order to make the reaction sufficiently rapid, to make use of highly reactive reducing agents, such as wood charcoal, which is relatively expensive.

In the copending U.S. application Ser. No. 190,163, filed Apr. 25, 1962, entitled, "Electric Arc Furnaces and Methods," issued as Patent No. 3,180,916 on Apr. 27, 1965, description is made of an electrical arc furnace of the reduction type which is provided with one or more electrodes operating on a molten bath within a furnace and from which the reaction gases escape only through the charge. Each electrode is surrounded with a device having an upper portion which engages the electrode in sealing relationship to prevent the escape of gases or vapors therebetween but which is electrically insulated therefrom. The device includes a lower portion joined in sealing relationship with the upper portion and in which the lower portion is formed of a refractory, heat conductive material with the lower portion spaced from the electrode to provide an annular space in between and with both the upper and lower portions of the device being water cooled. The device operates to maintain the raw materials fed into the furnace out of contact with the electrode and it is also provided with inlets for the intermittent introduction of cleaning gases to effect removal of conductive deposits and dusts which might have collected within the annular space and which might otherwise build up to enable short circuiting of the electrode.

A furnace of the type described permits reduction to be carried out at very high temperature but a number of disadvantages have also been encountered.

The protective device surrounding the electrode is exposed to damage by arcs which strike between it and the electrode.

The condensed vapors, drawn across the charge by the reaction gases, sometimes form crusts which render the charge impervious to gases to cause stoppage of the furnace of geysers of metallic vapors which issue at high pressure through cracks when they appear in the charge. Such jets operate to reduce yield and cause damage to the furnace. Attempts have been made to alleviate this situation by the use of fire irons to break the crusts but the operation is dangerous and laborious and uniform yields are still not obtainable.

In other instances, the charge remains too highly pervious to the reaction gases and vapors with the result that some of the vapors are allowed to escape. Efforts have been made to improve the recovery of vapors by way of increasing the cross-section of the raw material through which the vapors must pass before escape from the furnace but such increase in thickness of the feed section operates correspondingly to increase the pressure drop across the feed with corresponding increase in pressure within the furnace whereby excessive pressures are sometimes reached and difficulties are experienced in maintaining a vapor-tight seal about the electrodes.

Sometimes incompletely converted raw materials are found in the product tapped from the furnace, indicating incomplete reaction.

Thus it is an object of this invention to provide a reduction furnace of the type described and a method for the operation of same whereby the disadvantages heretofore described are substantially overcome; in which the raw material is maintained out of contact with the electrode; in which the arc travels directly from the electrode to the stripped bath, i.e. not covered by the charge (in contrast to so called submerged arc furnaces), and to make all the current feeding the electrode pass across the arc and to produce a high power concentration favourable to the reduction of oxides having a high enthalpy such as aluminum oxide, silicon dioxide, etc.; in which there is substantially complete recovery of condensible vapors; in which there is a substantially complete reaction of the raw materials to produce a relatively pure product free of inclusions; which provides for feed of the raw materials into the furnace at a rate controlled in accordance with the capacity of the electrode of the furnace for maximum utilization of the furnace; in which one or more products involved in the reduction reaction have a high vapor pressure at the very high temperature of said reaction, the problem being allowing the condensable vapors to condense within the charge feed, and at the same time the carbon monoxide produced to escape; in which the vapors are condensed in a predetermined area which constitutes the feed path of the raw materials into the furnace whereby crusts that are formed are effectively broken up to prevent the formation of vapor barriers in the furnace and to prevent the sudden releases of pressures; in which the vapors are consensed in a feed section for substantially immediate return of the condensed vapors as a part of the feed thereby to permit fuller recovery of vapors formed during the reaction and return of such condensed vapors to the reaction thereby to maintain more uniform reaction conditions; in which the pressure conditions maintained within the furnace are more uniform thereby to alleviate excessive pressures which might harm the furnace or interfere with the maintenance of the desired sealing relationship about the electrodes; in which the conditions leading to geysers or vapor jets are substantially completely alleviated thereby to provide for more uniform operation of the furnace and higher yield of product therefrom, and it is a related object to provide a furnace of the type described in which the materials subject to the reduction reaction within the furnace pass substantially in one direction beneath the electrode from a feed section at one end to the tap at an opposite end whereby the reactants and the reaction conditions are capable of control for complete and uniform reaction at a predetermined sequence and rate during passage through the furnace thereby to provide for more efficient utilization and control of the furnace for giving a higher yield of a more desirable reaction product from the furnace.

The invention also concerns an arc furnace enabling carbonaceous reducing agents which are economical in use, such as normal grade metallurgical coke, to be employed exclusively for the carbothermic reduction of the high enthalpy oxides already mentioned.

These and other objects and advantages of this invention will hereinafter appear and for purposes of illustration, but not of limitation, an embodiment of the invention is shown in the accompanying drawings in which:

FIG. 1 is a schematic elevational view through a furnace embodying the features of this invention;

FIG. 2 is a horizontal sectional view taken substantially along the line 2—2 of FIG. 1.

Figure 3:
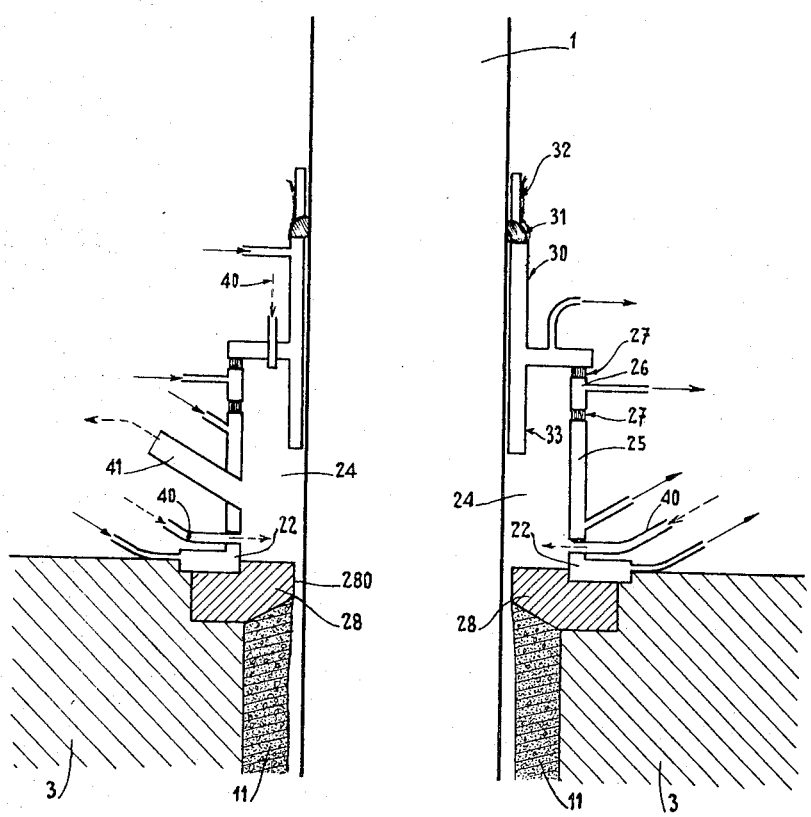
FIG. 3 is a vertical sectional view through an upper portion of the furnace showing the protective device about the electrode.

Briefly described, the invention resides in a furnace of the reduction type in which the arc passes directly from the electrode or electrodes into the stripped bath (i.e. the bath being not covered by the charge) on the hearth of the furnace and in which means are provided for passage of reaction vapors exclusively across the feed material into the furnace for recovery of the condensable part of the vapors by condensation on the material charged into the furnace; in which each electrode has a portion surrounded by a device which is electrically insulated from the electrode but in sealing engagement therewith to block the escape of vapors therebetween and to prevent contact of the electrode by the charge and is comprising a lateral prolongation gastightly extending like a dome across the top of the furnace to the furnace side walls, and in which the raw material is introduced into the furnace through one or more orifices dimensioned to enable feed material to be introduced at a rate for operation of the furnace at the full capacity of the electrodes, and which is provided with displacement means for displacement of raw material through said orifice into the furnace at a rate corresponding to the demand of the furnace and to prevent crust formation with the orifice being located in spaced relationship from the electrode and above the hearth of the furnace by amounts to prevent the raw materials from coming into contact with the electrode.

Referring now to FIGS. 1 and 2 of the drawings, the furnace includes electrodes 1 which extend downwardly into the furnace. Each of the electrodes is surrounded by an electrically insulating device 2, the lower portions of which are formed with carbon lateral prolongation 3 which extend laterally across the top of the furnace to the carbon side walls 4 about the interior of the furnace. The hearth 5 is also formed of carbon and the furnace is provided with a fireproof covering 6 of refractory material.

The raw material 8 is introduced into the furnace through one or more openings 20 extending through the side walls of the furnace for lateral displacement of raw material feed from a horizontally disposed feed tunnel 10 which communicates with the orifice and through which a plurality of pistons 7 are shiftable for lateral displacement of raw material feed through the tunnel into the furnace. The tunnel communicates with the lower end of a feed hopper or pit 13 into which the raw material is loaded for displacement by the piston in feeding relationship through the tunnel and into the furnace.

In operation of the furnace, condensation is vapors occurs to form solid crusts 11 which line the inside of the furnace and the edges of the tunnel with the heat in the furnace being sufficient to cause some of the condensate to form droplets 12 which fall back into the molten bath 21 on the hearth of the furnace. The reaction product is removed from the furnace through the tap holes 14.

In FIG. 3, the device 2 is illustrated with a lower portion provided with a ring 28 of refractory, heat conductive material, such as of carbon or graphite, which defines a narrow electrically insulated annular space 280 about the electrode. The ring is cooled, as by means of a jacket 22, through which cooling water is circulated and above which there is provided a cylindrical section in the form of a water cooled jacket 25. 31 is a bushing (joint) surrounding the electrode in a gastight manner in which the bushing is formed of material such as asbestos, and 32 is the stuffing box for the bushing 31. 30 is a water jacket which forms the upper portion of the device 2 for cooling the bushing 31 and the stuffing box 32 and the elements 26 and 27 are rings of dielectric refractory material, formed of such material as asbestos, and 33 is a cylindrical prolongation of the water jacket 30. The described elements define a chamber 24 surrounding the electrode above the annular space 280 and having a greater dimension than said annular space 280. Elements 40 and 41 constitute inlet and outlet passages respectively for gases employed to clean the chamber 24 in which the arrows with broken lines refer to the cleaning gases and arrows with full lines to the cooling water.

For a more complete description of a modification in a device of the type described, reference can be made to the above mentioned U.S. application Ser. No. 190,163, to the lower portions of which the lateral gastight prolongation 3 can be added.

A modification of the invention resides in the location of the tap hole or holes with respect to the feed whereby the path of travel of a controlled flow of materials from the feed to the tap necessarily passes through the zone of the arcs thereby the temperature conditions within the furnace can be regulated whereby uniform reaction conditions can be maintained in the various segments defining the path of travel of the material through the furnace such that phases of the reaction can be assigned and maintained in portions of the furnace for optimum control of the reaction of the materials as they pass through the furnace beneath the electrodes, and whereby substantially complete reaction can be achieved by the time the materials reach the tap hole to produce a final product which is substantially free of unreacted or unconverted raw material. The furnace can be constructed with a single feed orifice or a single tap hole one opposite the other but it will be understood that more than one orifice and/or more than one tap hole may be employed.

In the preferred practice of this invention, the feed pistons 7 are formed of metal, with or without water cooling, and they are arranged to extend horizontally in substantially side by side relationship. The pistons are adapted to be displaced in the direction toward and away from the opening 20 with a stroke which preferably extends from the back side of the hopper 13 to the front side of the tunnel 10 and through the opening 20 with the pistons dimensioned to have a height preferably less than the height of the tunnel and an overall width which is slightly less than the width of the tunnel and in endwise alignment therewith.

When, in normal operation, the hopper is filled with raw material to a level above the tunnel 10, the tunnel 10 will normally be filled with raw material responsive to actuation by the pistons to displace raw material from the pit into and through the tunnel.

It will be apparent that the condensible vapors released from the reaction will be limited to flow from the furnace through the feed tunnel and upwardly through the hopper. Thus the vapors will flow countercurrent to the feed of raw material whereby a temperature gradient will exist through the raw material from the high end at the inlet to a low end in the material forming the upper levels in the hopper. As a result, substantially all of the condensible vapors will be condensed out of the gases and onto the feed material before escape from the furnace.

In accordance with an important concept of this invention, the feed tunnel is dimensioned to have a length whereby the major proportion of the condensible vapors, which are entrained with the escaping carbon monoxide gases, will be condensed out in the charge located within the tunnel portion.

Thus condensation will take place in an area where the temperature is sufficiently high to prevent the formation of hard and impervious crusts and the forces generated by the frequent thrusts of the piston through the charge in the tunnel are sufficient to break up any crusts before harmful formations thereof. Thus harmful crusts are substantially avoided thereby to obviate the many undesirable features ordinarily accompanying crust formations.

Introduction of charge into the furnace in response to displacement by the feed piston 7 permits effective control of the feed rate in proportion to consumption per unit time thereby to provide a controlled rate of feed which is far superior to feed systems heretofore employed wherein the raw material falls spontaneously gravitationally in free roll down a slope into the furnace as the material is consumed. The latter gives intermittent and uncontrolled feed with insufficient material entering the furnace when a bridge or block develops and with excessive amounts of material introduced into the furnace when such block or dam suddenly breaks to free a large amount of material. The pistons can be mounted for displacement together in feeding relationship to the pistons can be mounted for individual operation to constitute separate rams for displacement of any one or more or combination of pistons for most effective operation so that the outlet for the reaction gases through the feeding orifice 20 is closed only partially and for a short time. While the frequent operation of the pistons will be effective to generate forces that prevent formation of harmful crusts on the walls of the feed tunnel, removal or crusts can be supplemented by other known means, such as by the use of fire irons acting across orifices especially provided in the walls, or equivalent means. The feed pistons can be operated continuously at a slow rate or they can be operated intermittently in timed relationship with the capacity of the furnace.

An example will be given by way of illustration in the construction and use of a furnace embodying the features of this invention in the electrothermic production of aluminum from the oxide ores of aluminum. However, it will be understood that similar relationships and construction can be employed to adapt the furnace for use with other materials.

The total cross-section of the feed pistons 7 has been found to bear a close relationship with the power of the electrodes. In general, the total cross-sectional area of the feed pistons should be 0.3 to 3.0 more particularly from 0.5 to 1.5 sq. cm. per kw. of power of the furnace. When the total cross-sectional area of the pistons is greater than 3 sq. cm. per kw. power of the furnace, the mean linear speed of the displacement of the charge towards the center of the furnace will be too low. This would undesirably increase the risk of clogging of the feed by condensation of the metallic vapors. If the total cross-section of the feed pistons is less than 0.3 sq. cm. per kw. power of the furnace, the rate of escape of the gases through the openings formed by the pistons would become excessive. Thus, it would become difficult to obtain good countercurrent exchange between the gases and condensible vapors with the charge. This exchange, which is important to the satisfactory operation of the furnace, provides for the retention of the condensible vapors in the charge thereby not only to recover the vaporized material but also to preheat the charge for more efficient utilization of the raw materials and more efficient utilization of the heat, both of which add up to more uniform and efficient operation of the furnace.

Another important concept for electrothermic production of aluminum in a furnace embodying the features of this invention resides in the location of the feed orifice with respect to the distance from the electrode and from the hearth of the furnace. For best practice, the feed orifice should be located a distance from the axis of the electrodes which is at least three times the diameter of an electrode when measured in the horizontal direction and the lower edge of the orifice should be located above the hearth of the furnace by a distance equal to two to three times the diameter of the electrode. Under these conditions, the normal slope of the raw material in the furnace from the orifice to the bath will be such as not to cross into contact with an electrode.

A vertical distance greater than that defined above would unnecessarily increase the length and consequently the weight of the electrodes.

The hopper 13 can be modified to include a cover or gas-tight lock (not shown) and a chimney (not shown) for the collection and exhaust of waste gases formed primarily of carbon monoxide. It has been found that a furnace of the type described is so efficient in the direction and collection of gases that an exhaust can be secured containing a high concentration of carbon monoxide, such as 98% by volume, thereby to enable recovery of carbon monoxide gases for exploitation by known methods.

In a preferred embodiment of the invention, the water cooled jacket 30 constituting the upper portion of the device 2 surrounding the electrode may be provided with a prolongation 33 which gives protection from the heat radiated by the electrode to the rings 26 and 27 of dielectric refractory material and which electrically insulate the upper portion 30 from the lower portion of the device 2. The protective effect which the prolongation 33 has on the electrical insulating rings 26 and 27 may be regarded as a screening effect.

In a special embodiment of the invention, electrical short circuiting within the device 2 surrounding the electrode can be prevented when the distance between the latter and the ring 28, forming the lower portion of the device 2 (which distance may also be defined as the width of the annular space 280), is from 3–10% of the diameter of the electrode. The distance between the electrode and the cylindrical water cooled jacket 25 above the ring 28 (which can also be defined as the width of the chamber 24) may be from 25–40% of the diameter of the electrode. If the width of the annular space 280 is less than 3% of the diameter of the electrode, the slightest non-uniformity in centering or shaping the electrode can result in such variations in the annular space as to invoke dangers of short circuiting. If the width is greater than 10%, the screening function of the ring 28 with respect to the heat radiation of the furnace and of the condensible vapors would be insufficient. If the width of the chamber 24 is less than 25% of the diameter of the electrode, then, notwithstanding the action of the cleaning gases, this would encourage the current to pass from the electrode towards the jacket 25 by way of conductive crusts deposited in the chamber 24. A width of over 40% would unnecessarily increase the amount of space taken up by the device 2.

In accordance with the practice of this invention, the metallic water jacketed inner walls of the chamber 24 may be provided with a known refractory electrically insulating covering, such as an enamel of refractory cement, thereby to prevent short circuiting due to the presence of crusts or powdery conductive deposits in said chamber 24.

The description will hereinafter be made of the new and improved process of operation of the furnace.

Since the descent of the charge into the hearth of the furnace is controlled by the feed piston 7, the furnace can be controlled for uniform operation at maximum efficiency. By regulation of the piston feed, it is possible to prevent over-feeding of the furnace which would otherwise result in the appearance of unconverted raw materials in the product tapped from the furnace, in excessive cooling of the bath, etc. By regulation of the piston feed, it is also possible to avoid under-feeding of the furnace which would result in clogging of the charge entering the furnace, overheating of the bath, etc.

It is advantageous to arrange for the various rams of the feed pistons 7 to operation in succession so that the escapement of gases through the feeding orifice 20 is blocked only partially for a short period of time.

The raw materials used as feed or charge to the furnace generally comprise a mixture of an oxide having a high enthalpy, such as aluminum oxide, or silicon dioxide with a carbonaceous reducing agent. Satisfactory operation of the furnace becomes easier when the carbonaceous reducing agent is less reactive, such as normal grades of metallurgical coke. Under these conditions, the charge does not generally give rise to any appreciable reaction as long as it has not actually entered into the reaction zone of a furnace. This prevents initial fusion in the feed hopper 13 or the feed tunnel 10 which might otherwise interfere with the desired porosity of the charge. The use of carbon reducing agents of lower reactivity, such as metallurgical coke, gives the charge good mechanical resistance towards the operating feed pistons and it is also particularly advantageous from the standpoint of economy in the cost of raw materials.

It is advisable to make use of raw materials having a sufficiently coarse grain size, such for example as particles of at least 10 mm., in order to give the charge good porosity. The raw material may be in the form of a powder, such as a powdered oxide, possibly agglomerated with the use of binders by known procedures.

It is advantageous to cool the device 2, including the ring 28, surrounding the electrode, in the zone closest to the electrode (i.e. the zone of the ring 28 defining the annular space 280) to between 600° and 1000° C. as by means of the water jacket 22. When the temperature falls below 600° C., the amount of condensation into the ring 28 would undesirably increase so that the condensation would build up until it comes into contact with the electrode. This might have the disadvantage of preventing normal movement of the electrode. A temperature above 1000° C. would encourage the formation of a permanent arc between the ring 28 and electrode. When the above temperature range is observed, it is possible to obtain relatively little conductive condensation in the annular space. This is a unique result and operates effectively to avoid the formation of arcs between the ring 28 and the electrode and any such arcs as are rarely formed are weak in character. They cause virtually no damage since they pass between two portions made of graphite or carbon, i.e. the electrode and the ring 28.

Satisfactory operation of the furnace is also achieved when the bushings 31 interconnecting the electrode and the device 2 in sealing relationship are cooled to a temperature which does not exceed 600° C. as by means of the fluid cooled jacket 30. A temperature above 600° C. may cause damage to the sealing connection.

The current density across the electrodes is generally maintained between 3 and 15 amps per sq. cm. and more particularly between 5 and 10 amps per sq. cm., thus encouraging a high concentration of power in the furnace.

The cleaning gas for removing any crusts or powdery conductive deposits from the chamber 24 or which may form on the insulators 26 and 27 is preferably introduced into the chamber 24 in intermittent blasts. The cleaning gas is selected of an inert gas, such as nitrogen, or an oxidizing gas such as more or less humid air.

The novel furnace is applicable primarily to the manufacture of metals and metalloids by thermal reduction with carbon of metals having oxides characterized by high enthalpy, such as aluminum or silicon, and the furnace of this invention is more particularly applicable for carrying out the processes forming the subject matter of the previously issued U.S. Patent No. 2,974,032.

It will be understood that changes may be made in the details of construction, arrangement and operation without departing from the spirit of the invention, especially as defined in the following claims.

We claim:

1. An electric arc furnace for reduction of a feed material comprising an oxide ore and a carbonaceous reducing agent, in which substantially all of the electric current supplied to each electrode passes from said electrode into the stripped molten bath on the hearth of the furnace directly through the arc as distinguished from passage through the arc and through the feed material, an electrically insulating device about a portion of each electrode and engaging the electrode in sealing relationship to prevent the escape of vapors therebetween, a lateral prolongation of said device gastightly extending like a dome across the top of the furnace to the furnace side walls, at least one feed opening in a furnace side wall for introduction of the feed material into the furnace, a feed tunnel leading to the feed opening which is located in spaced relationship from the next electrode and above the hearth of the furnace by amounts to prevent the feed material from coming into contact with the electrode, pistons for displacing feed material laterally into said feed tunnel and through said feed tunnel into the furnace whereby the feed tunnel is maintained substantially filled with feed material, the reaction vapors arising from within the furnace being limited to passage from the furnace through said feed tunnel whereby substantially all of the condensible part of the vapors condenses upon the feed material for return to the furnace in response to displacement of feed material from the tunnel into the furnace, and at least one top hole in a side wall of the furnace adjacent the hearth for drainage of molten product from the furnace.

2. An electric arc furnace as claimed in claim 1 which includes a hopper in communication with the ingoing side of the feed tunnel.

3. An electric arc furnace as claimed in claim 1 in which the pistons for displacing feed material through said tunnel comprises horizontally disposed pistons movable across the bottom of the hopper and into the horizontally disposed tunnel.

4. An electric arc furnace as claimed in claim 3 in which the pistons are arranged in side by side relationship across the width of the tunnel and in endwise alignment therewith.

5. An electric arc furnace as claimed in claim 3 in which the pistons are operable simultaneously in the direction toward and away from the feed tunnel in feeding movements.

6. An electric arc furnace as claimed in claim 3 in which the pistons are separately operable for movement in the direction toward and away from the feed tunnel in feeding movements.

7. An electric arc furnace as claimed in claim 3 in which the total cross-section of the feed pistons is within the range of 0.3 to 3.0 sq. cm. per kw. power of the furnace.

8. An electric arc furnace as claimed in claim 3 in which the total cross-section of the feed pistons is within the range of 0.5 to 1.5 sq. cm. per kw. power of the furnace.

9. An electric arc furnace as claimed in claim 1 in which the feed opening in the side wall of the furnace is spaced horizontally from the axis of the electrode by an amount greater than three times the diameter of the electrode.

10. An electric arc furnace as claimed in claim 1 in which the feed opening is spaced above the hearth of the furnace by an amount within the range of two to three times the diameter of an electrode and in which the feed opening is spaced horizontally from the axis of the electrode by an amount greater than three times the diameter of an electrode.

11. An electric arc furnace as claimed in claim 1 in which the path of the feed material through the furnace in the molten bath from the feed openings to the tap holes necessarily passes through the zones of the arcs.

12. An electric arc furnace as claimed in claim 1, comprising a single feed opening and a single tap hole one opposite the other in opposite side walls of the furnace.

13. An electric arc furnace as claimed in claim 1 in which said device about a portion of each electrode comprises an upper portion which engages the electrode in sealing relationship to prevent the escape of vapors therebetween but is electrically insulated therefrom, a lower portion in sealing relationship with the upper portion and in which the lower portion is formed of a refractory heat conductive material with the lower portion spaced from the electrode to provide an annular space in between and with both the upper and the lower portions cooled, a prolongation of said device maintaining the feed material fed into the furnace out of contact with the electrode, said device including inlets and outlets therethrough.

14. An electric arc furnace as claimed in claim 13 which includes inlets and outlets through said device into communication with the annular space and means for introducing blasts of a gaseous material through said space for the removal of deposits and dust from within said space.

15. An electric arc furnace as claimed in claim 14 which includes rings of insulating material for insulating the upper portion from the lower portion and a prolongation from the upper portion circumferentially arranged in closely spaced relationship about the electrode for protection of the rings against the radiation of heat from the electrode.

16. An electric arc furnace as claimed in claim 14 in which the annular space between the lower portion of the device and the electrode is within the range of 3–10% of the diameter of the electrode.

17. An electric arc furnace as claimed in claim 14 in which the annular space between the upper portion of the device and the electrode is within the range of 25–40% of the diameter of the electrode.

18. An electric arc furnace as claimed in claim 14 wherein the cooling means in the lower portion of the device are provided for maintaining the portion of the device surrounding the electrode at a temperature within the range of 600° to 1000° C.

19. An electric arc furnace as claimed in claim 14 wherein the cooling means in the upper portion of the device are provided for maintaining the upper portion of the device surrounding the electrode at a temperature below 600° C.

20. The furnace as claimed in claim 1, in which the separate arms of the feeding pistons are operated in succession whereby to close the outlet for the reaction vapors through the feeding opening only partially and for a short time.

21. The furnace as claimed in claim 1 in which the amount of feed material introduced per time unit into the furnace by the feed pistons is in direct relation with the electrical power supplied therein.

22. The furnace as claimed in claim 1, wherein said carbonaceous reducing agent shows a low reactivity as normal-grade metallurgical coke.

23. In an electric arc furnace for reduction of a feed material comprising an oxide ore and a reducing agent, an enclosure having a top wall, vertically disposed side walls and a hearth on the bottom wall for retaining the molten bath, an electrode extending downwardly into the furnace for passage of an arc between the electrode and the bath, a feed opening in one of the furnace side walls for the introduction of feed material into the furnace, a horizontally disposed feed tunnel leading into the feed opening, means for displacing feed material laterally into said feed tunnel and through said feed tunnel into the furnace whereby the feed tunnel is maintained substantially filled with feed material, an electrically insulating means about a portion of the electrode and engaging the electrode in sealing relationship to prevent the escape of vapors therebetween, whereby vapors arising from within the furnace are limited to passage from the furnace through said feed tunnel whereby the major portion of the condensible vapors condenses upon the feed material within the tunnel for return to the furnace in response to displacement of feed material from the tunnel into the furnace, and a tap hole in a side wall of the furnace adjacent the hearth for drainage of molten product from the furnace.

24. The method of operation of an electric arc furnace for reduction of a feed material comprising an oxide ore and a reducing agent comprising introducing the feed material into the furnace through an elongate horizontally disposed chamber in communication with a side wall of the furnace, maintaining the arc of the furnace between the electrode and the bath on the hearth of the furnace, sealing the electrode to block the escape of gases and vapors from within the furnace thereby to limit the escape of gases and vapors from the furnace through the feed tunnel, maintaining the feed tunnel filled with feed material whereby the vapors and gases escaping from within the furnace are caused to pass through the body of feed material within the feed tunnel whereby the major portion of condensible gases condenses out on the feed material while the uncondensible gases continue through the feed tunnel for escape from the furnace and intermittently pushing the feed material within the feed tunnel into the furnace to break up any crusts formed by the condensed vapors and for return of the condensed vapors with the feed material into the furnace, and periodically tapping the product from the hearth of the furnace.

25. The process as claimed in claim 24 in which the feed tunnel is on one side of the electrodes and the tap is on the other side of the electrodes whereby the materials flow in a substantially linear path through the furnace from the feed end to the tap end and beneath the electrodes.

References Cited

UNITED STATES PATENTS

| | | | |
|---|---|---|---|
| 1,775,606 | 9/1930 | Southgate | 13—2 |
| 2,134,969 | 11/1938 | Erdmann | 13—9 |
| 2,763,903 | 9/1956 | Herres | 13—9 X |

BERNARD A. GILHEANY, *Primary Examiner.*

H. B. GILSON, *Assistant Examiner.*